UNITED STATES PATENT OFFICE.

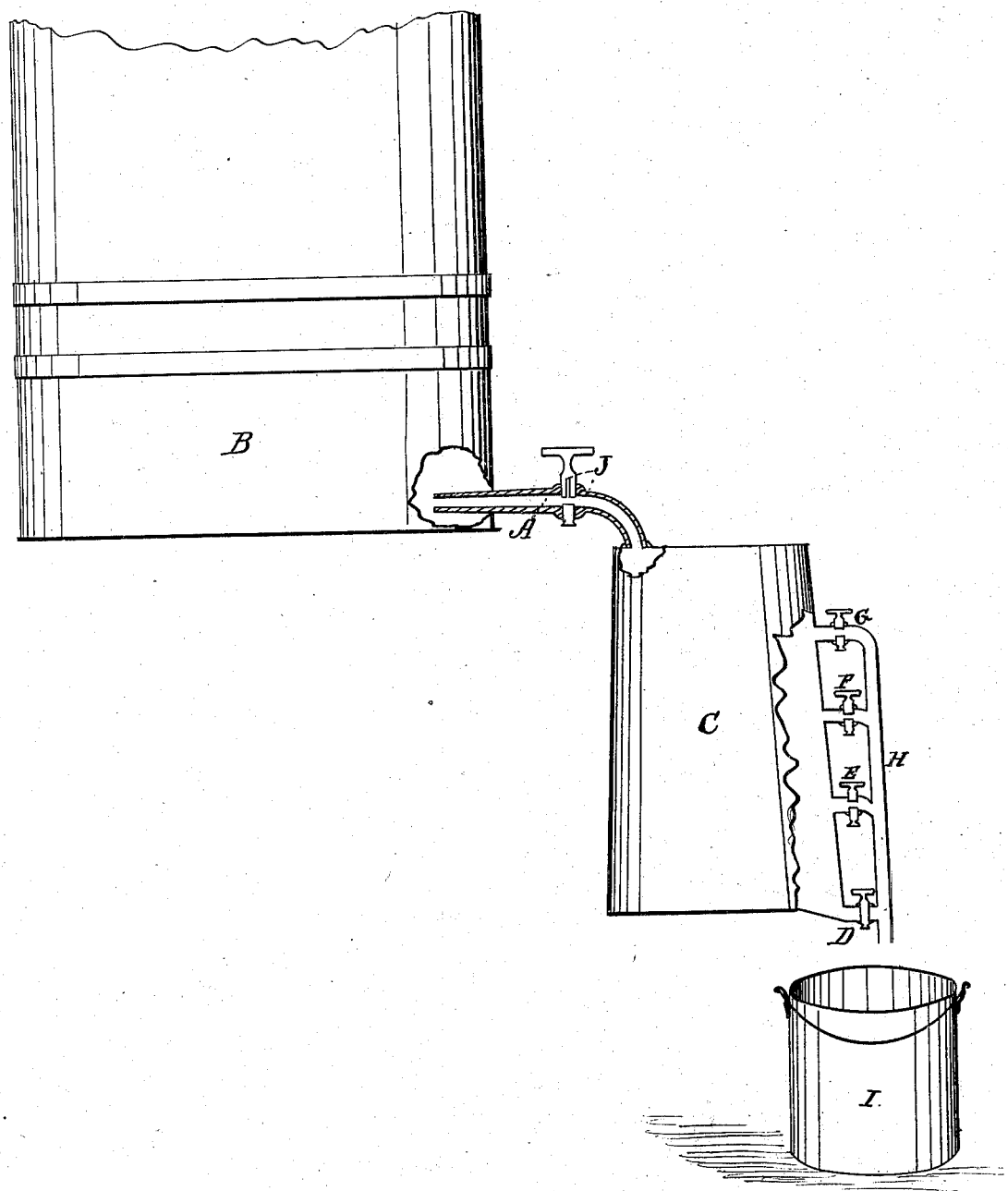

RICHD. F. STEVENS, OF SYRACUSE, NEW YORK.

APPARATUS FOR DRAWING AND MEASURING LIQUIDS.

Specification of Letters Patent No. 7,999, dated March 25, 1851.

*To all whom it may concern:*

Be it known that I, RICHARD F. STEVENS, of Syracuse, in the county of Onondaga and State of New York, have invented a new and useful Improvement in Drawing and Measuring Liquids; and I do hereby declare the following to be a full, clear, and exact description of the construction and operation of the same, reference being had to the annexed drawings, making part of this specification.

The nature of my invention consists in combining a measure, or measures, with faucets or gates used in drawing liquids from cans, casks, barrels, &c.

A, is a faucet attached to the can B, and may be constructed according to any known plan.

C, is a measure, made of copper, tin, or other material, and of capacity sufficient to contain a gallon, which is attached to the end of the faucet (A).

D, E, F, and G, are faucets attached to the measure at different heights, and connect with the tube or conductor (H) in such a manner that the liquid may be discharged from either of the faucets last mentioned into the tube and thence into any vessel (I) which may be placed underneath.

The faucet (A) is so constructed, that when turned so as to cut off the passage between the can and measure, a vent or air-hole is opened in the top of the measure.

The operation of my invention is as follows: By opening the faucet (A) thereby connecting the can and measure, the liquid contained in the can will pass into the measure, and the air contained in the measure will pass into the can. By closing the facuet (A), the vent or air hole (J) will be opened and the liquid contained by the measure may then be drawn by opening either of the lower faucets, which are so placed that the lower one (D) will discharge the whole contents of the measure, or one gallon; the faucet (E) will discharge one half gallon; (F) will discharge one quart; and (G) will discharge one pint.

The measure may be constructed as above described, or may be divided into compartments, and discharging faucets attached to each.

The measures may be made of sufficient capacity to contain any desired amount of the liquid to be measured.

By the above described arrangement of faucets and measures, the liquid is measured at the same time that it is being drawn; the measure is confined to the cask to which it belongs; being closed, it is protected from dust and insects; the use of several separate measures and funnels is dispensed with; and a considerable saving of time is effected in drawing and measuring liquids.

What I claim as my invention and desire to secured by Letters Patent, is—

The combination of measures with faucets, cocks, or gates, used in drawing liquids from cans, casks, barrels, &c., in such a manner, that by opening the faucet attached to the cask, the measure will be filled; then by closing the same, the desired amount may be drawn by opening the corresponding faucet in the measure, the whole combined substantially as described, and for the purpose set forth.

RICHD. F. STEVENS.

Witnesses:
  URAIL SMITH,
  CHARLES OTIS.